(12) United States Patent
Henn et al.

(10) Patent No.: US 10,187,614 B2
(45) Date of Patent: Jan. 22, 2019

(54) ROTATION MODULE FOR AN INSPECTION SYSTEM

(71) Applicant: iPEK International GmbH, Sulzberg (DE)

(72) Inventors: Peter Henn, Krugzell (DE); Fabian Zahnd, Kempten (DE)

(73) Assignee: IPEK INTERNATIONAL GMBH, Sulzberg (DE)

( * ) Notice: Subject to any disclaimer, the term of this patent is extended or adjusted under 35 U.S.C. 154(b) by 184 days.

(21) Appl. No.: 14/484,382

(22) Filed: Sep. 12, 2014

(65) Prior Publication Data

US 2016/0080701 A1 Mar. 17, 2016

(30) Foreign Application Priority Data

Sep. 13, 2013 (DE) .................... 20 2013 104 188 U (51) Int. Cl.
| | |
|---|---|
| H04N 5/253 | (2006.01) |
| H04N 7/18 | (2006.01) |
| H04N 5/225 | (2006.01) |
| E03F 7/00 | (2006.01) |
| E03F 3/00 | (2006.01) |
| E03F 7/12 | (2006.01) |
| B08B 9/04 | (2006.01) |
| G01M 3/00 | (2006.01) |

(52) U.S. Cl.
CPC .............. *H04N 7/183* (2013.01); *B08B 9/04* (2013.01); *E03F 3/00* (2013.01); *E03F 7/00* (2013.01); *E03F 7/12* (2013.01); *G01M 3/005* (2013.01); *H04N 5/2252* (2013.01); *H04N 5/2256* (2013.01); *H04N 2005/2255* (2013.01)

(58) Field of Classification Search
CPC ....... E03F 3/00; E03F 7/00; H04N 2005/2255
USPC .......................................................... 348/84
See application file for complete search history.

(56) References Cited

U.S. PATENT DOCUMENTS

| | | | | |
|---|---|---|---|---|
| 5,956,077 A | * | 9/1999 | Qureshi .................. | B25J 9/06 348/82 |
| 6,697,102 B1 | * | 2/2004 | Olsson ................ | E21B 47/0002 324/323 |
| 7,553,277 B2 | * | 6/2009 | Hoefig ............... | A61B 1/00179 600/137 |
| 8,773,525 B2 | * | 7/2014 | Lortie ...................... | E03F 7/12 348/85 |

(Continued)

FOREIGN PATENT DOCUMENTS

| | | |
|---|---|---|
| DE | 19549473 A1 | 9/1997 |
| DE | 20318292 U1 | 5/2004 |

OTHER PUBLICATIONS

English translation of European Search Report with the European Search Opinion issued for corresponding European Patent Application No. 14182355.9 dated Jan. 23, 2015.

*Primary Examiner* — Tat C Chio
*Assistant Examiner* — Fabio S Lima
(74) *Attorney, Agent, or Firm* — Myers Wolin, LLC (57) ABSTRACT

The invention relates to a device for an inspection system, in particular, to a sewer and pipe, respectively, inspection system comprising a rotation module, which is coupled to a pivoting housing, wherein the rotation module is rotatable about its longitudinal axis relatively to the pivoting housing, and wherein the rotation module comprises a slip ring for signal and energy transmission, respectively, between the rotation module and the pivoting housing.

11 Claims, 4 Drawing Sheets

(56) References Cited

U.S. PATENT DOCUMENTS

| | | | | |
|---|---|---|---|---|
| 2005/0275725 A1* | 12/2005 | Olsson | ............... | G03B 37/005 |
| | | | | 348/207.99 |
| 2008/0021662 A1* | 1/2008 | Hinn | ................. | G01M 3/005 |
| | | | | 702/34 |
| 2010/0059219 A1* | 3/2010 | Roberts | ............ | E21B 47/0002 |
| | | | | 166/250.01 |
| 2014/0023358 A1* | 1/2014 | Dumig | ............... | G01M 3/005 |
| | | | | 396/428 |

* cited by examiner

ROTATION MODULE FOR AN INSPECTION SYSTEM

CROSS REFERENCE TO RELATED APPLICATIONS

This application claims priority to German Application No. 20 2013 104 188.2, filed Sep. 13, 2013, the contents of which are incorporated by reference herein.

FIELD OF THE INVENTION

The invention relates to a device for an inspection system, in particular, a sewer and pipe, respectively, cleaning system with a rotation module, as well as an inspection system having a device according to the invention.

BACKGROUND OF THE INVENTION AND PRIOR ART

For performing pipe and sewer inspections, respectively, it is known to use so-called sewer and pipe, respectively, inspection systems, which may be introduced into the sewer and drainage pipe, respectively, and may be moved, for example, may be displaced within the sewage pipe. The sewage pipe inspection systems may comprise an image acquisition means, for example, a camera and a video camera, respectively, which, for example, may be arranged on a carriage of the sewage pipe inspection system. Instead of or additionally to a camera and a video camera, respectively, tools, for example, pliers, a claw, or milling means may be arranged.

The camera and the video camera, respectively, as well as the tools may be arranged rotatably around their longitudinal axes or pivotally at the carriage of the sewage pipe inspection system. During recording of images and video images, respectively, by means of the camera and video camera, respectively, it is desirable to display the image which has been taken or the video images which have been taken independently from the rotational angle of the camera or the video images which have been taken independently from the rotational angle of the video camera in the correct position. In prior art, it is provided for images which have been taken in a skewed manner which may be available in digital form to be rotated by, for example, transforming the image data in order to obtain an image in the correct position. This, however, has the disadvantage that when using a rectangular image sensor, after a rotation of the image, there no longer is the entire image information present in the rotated image. Further, the rotation of images is CPU-intensive which, in particular, for video images, is disadvantageous, if these have to be rotated almost in real time.

In case tools are arranged on the carriage of the sewage pipe inspection system, then it is desirable that the tool may be rotated independently of the receiving device for the tool.

Therefore, it is an object of the present invention, to at least partially avoid the disadvantages known from prior art and to provide solutions which enable to always display images which have been taken in the correct position, and to rotate and pivot, respectively, tools independently of their tool receiver.

SUMMARY

According to the invention, this object is solved by a device for an inspection system as well as an inspection system according to the independent claims. Preferred embodiments of the invention are defined in the dependent claims.

Accordingly, a device for an inspection system, in particular, a sewer and pipe, respectively, inspection system is provided which comprises a rotation module which is coupled to a pivoting housing, wherein the rotation module is rotatable around its longitudinal axis relative to the pivoting housing, and wherein the rotation module comprises a slip ring for signal and energy transmission between the rotation module and the pivoting housing.

The slip ring enables the rotation module to be rotated in both directions by 360° and more independently of the rotation angle of the pivoting housing. By adjusting the rotation angle of the rotation module, an image taken by a camera arranged on the rotation module may be taken in the correct position, and does not have be edited in order to obtain an image in the correct position. Further, a tool provided on the rotation module may be rotated independently of the rotation axis of the pivoting housing.

In an embodiment of the invention, the device further comprises a pivoting fork to which the rotation module is fixed releasably, and by means of which the rotation module is coupled to the pivoting housing, wherein the pivoting fork is pivotable about a pivot axis relative to the pivoting housing. Thereby, not only the rotation angle of the rotation module may be adjusted, but rather also the rotation module may be pivoted about the pivot axis.

In an embodiment of the invention, a first contact board is provided on the pivoting fork, and a second contact board is provided on the rotation module, wherein the first contact board may be coupled to the second contact board, and wherein the second contact board is operatively coupled to the slip ring. Thereby, the rotation module may be released from the pivoting housing and from the pivoting fork, respectively, especially easily such that, for example, a particular simple and fast replacement of a rotation module by another rotation module is enabled.

Preferably, the pivoting housing is arranged on the inspection system rotatably around its longitudinal axis.

In an embodiment of the invention, the rotation module comprises a housing and a rotation axis, wherein the housing is supported rotatably around the rotation axis on the rotation axis, wherein in the housing, a rotary encoder and a motor are arranged, which respectively are fixedly connected to the housing, wherein the rotary encoder and the motor are coupled to the rotation axis, wherein the motor is provided to rotate the housing relative to the rotation axis, and wherein the rotary encoder is provided in order to record the rotation angle relative to the rotation axis. The entire means which are necessary for rotating the rotation module, thereby are accommodated within the housing of the rotation module such that a particularly simple connection of the rotation module at the pivoting fork and at the pivoting housing, respectively, is enabled.

In an embodiment of the invention, the slip ring is arranged in the rotation axis.

Preferably, the motor is coupled to the rotation axis via a gear wheel connection, preferably, via gear wheels with slip coupling.

In an embodiment of the invention, an imaging means is arranged in the housing. The imaging means may comprise a digital imaging means, for example, a CCD imaging sensor with corresponding electronics and lens. The imaging means is configured to take single pictures or video sequences.

In the housing, preferably, two illumination means, preferably two light emitting diodes may be arranged. The light emitting diodes may be provided in order to illuminate the surroundings or, for example, to project measurement and reference points, respectively, onto an object to be measured and to be taken, respectively, by the imaging means. Because the illumination means are arranged within the housing, and the housing is held in the correct position, it is also ensured that also the spots to be created by the illumination means are also in the correct position. In particular, if the light spots created by the illumination means are also mapped to the images taken by the imaging means, it is ensured that in the images taken, also the light spots are in the correct position, which substantially simplifies the evaluation of the images taken.

In an embodiment of the invention, the housing or a tool at the housing, in particular, claws or milling means, or sensors may be arranged.

It is preferred, if the housing is configured in a pressure- and/or water-tight manner.

In a preferred embodiment of the invention, the longitudinal axis of the rotation module, the longitudinal axis of the pivoting housing, and/or the pivot axis of the pivoting fork may respectively be assigned to a rotary sensor and a rotation angle sensor, respectively. Thereby, it is possible to, for example, control the motor arranged in the housing depending on the rotation angle detected by the rotary sensor assigned to longitudinal axis of the pivoting housing, in order to keep the imaging device arranged within the housing independently of the rotation angle of the pivoting housing in the correct position.

In an embodiment of the invention, the rotation module may comprise an electronic circuit, which is adapted to control the motor depending on the rotation angle of the pivoting housing. In an alternative embodiment, the electronic circuit may also be arranged outside of the device, and may be coupled to the motor and the rotary encoder, respectively, via the contact boards and via the slip ring, respectively.

BRIEF DESCRIPTION OF THE DRAWINGS

Further details and features of the invention as well as concrete, in particular, preferred embodiments of the invention may be derived from the subsequent description in connection with the drawings, in which.

DETAILED DESCRIPTION OF THE PREFERRED EMBODIMENTS

Figure 1A:
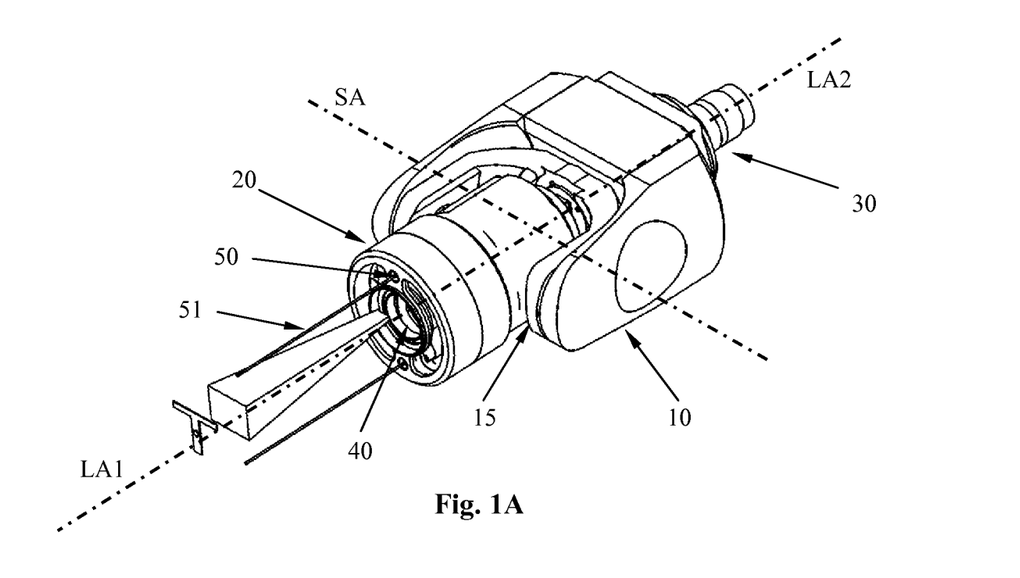
FIGS. 1A and 1B show a device according to the invention having a rotation module, which is coupled to the pivoting housing via a pivoting fork, on the one hand, in a non-rotated or non-pivoted position of the rotation module (FIG. 1A), and on the other hand, in a rotated position of the pivoting housing and pivoted position of the pivoting fork (FIG. 1B)
Figure 1B:
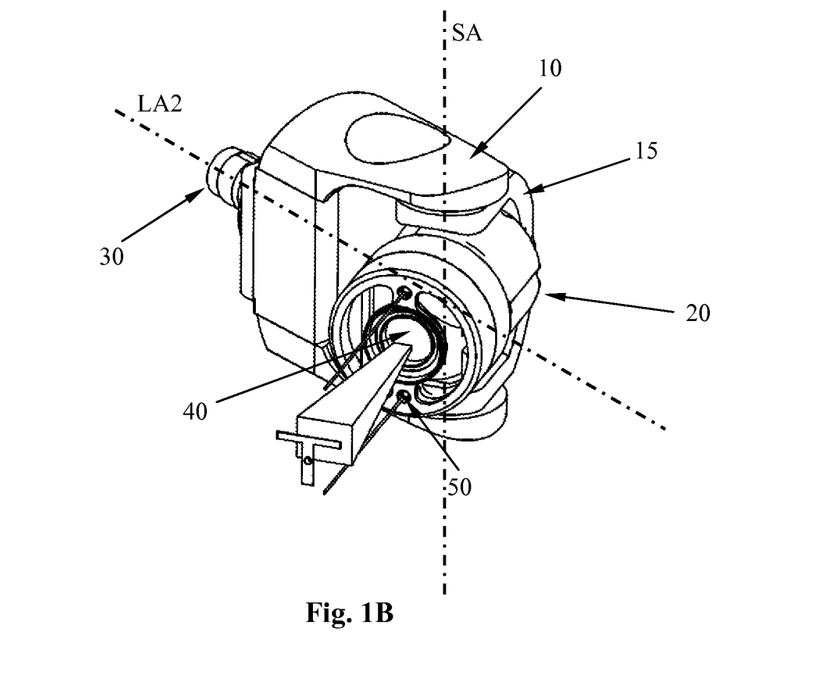

FIGS. 1A and 1B show a device according to the invention for an inspection system having a rotation module 20, which is coupled via a pivoting fork 15 to a pivoting housing 10.

In FIG. 1A, the device is shown it its normal position, whereas in FIG. 1B, the pivoting housing is rotated around its longitudinal axis LA2 by 90°, and the pivoting fork 15 is pivoted by approximately 45° about the pivot axis SA.

The device comprises a pivoting housing 10, which has at its rear end a rotation axis 30, via which the device, for example, may be connected to an inspection carriage or to a lifting means of the inspection carriage or to another device or connection device, or means of the inspection carriage. The pivoting housing is rotatable around its longitudinal axis LA2 in both directions by 360°, wherein the signal and energy transmission is carried out via a slip ring such that the pivoting housing may be rotated about the longitudinal axis LA2 virtually infinitely.

Between the two side walls of the pivoting housing 10, a pivoting fork 15 is arranged, wherein the pivoting fork 15 is pivotable about a pivot axis SA relative to the housing 10.

The pivoting fork 15, in turn, receives the rotation module 20 such that the rotation module together with the pivoting fork 15 may be pivoted relative to the pivoting housing 10. The arrangement of the rotation module 20 at the pivoting fork 15 and the connection of the rotation module 20 to the pivoting fork 15, respectively, is described in further detail in connection with FIG. 2.

The rotation module 20, in turn, is rotatable about its longitudinal axis LA1 relative to the pivoting housing 10 and to the pivoting fork 15, respectively.

Thereby, the rotation module 20 may be rotated about all three axes.

According to the invention, the rotation module 20 may be rotated depending on the rotation angle of the pivoting housing 10 by a rotation angle about the longitudinal axis LA1 such that a camera 40 arranged in the rotation module may take an image independently of the rotation angle of the pivoting housing always in the correct position. The specific configuration of the rotation module 20 will be described in more detail with reference to FIGS. 4A and 4B.

Stoppers are provided at the pivoting fork 15 and at the pivoting housing 10, respectively, which delimit the maximum pivot angle of the pivoting fork 15 about the pivot axis SA in both directions, in order to avoid any damage of the rotation module 20 due to a large pivot angle, if, for example, the rotation module 20 abuts against the pivoting housing 10 when a pivot angle which is too large.

With the embodiment of the rotation module 20 shown in FIGS. 1A and 1B, the rotation module has two illumination means 50, which here are configured as laser diodes. By means of the laser diodes 50, for example, laser beams 51 may be projected onto an object to be recorded by the camera 40 or an object to be measured. Because the laser diode 50 and the camera 40 are comprised in the rotation module 20 and are a component of the rotation module 20, respectively, and are arranged in the rotation module 20, respectively, the camera 40 as well as also the laser diodes 40 rotate together with the rotation module around the longitudinal axis LA1 such that for an image taken with the camera 40, which includes the projected light spots, the light spots always have the correct position relative to the recorded object within the image.

Of course, also other and additional, respectively, illuminating means may be arranged at the rotation module, by means of which, for example, an object to be recorded and an area to be recorded, respectively, may be illuminated.

Figure 2:
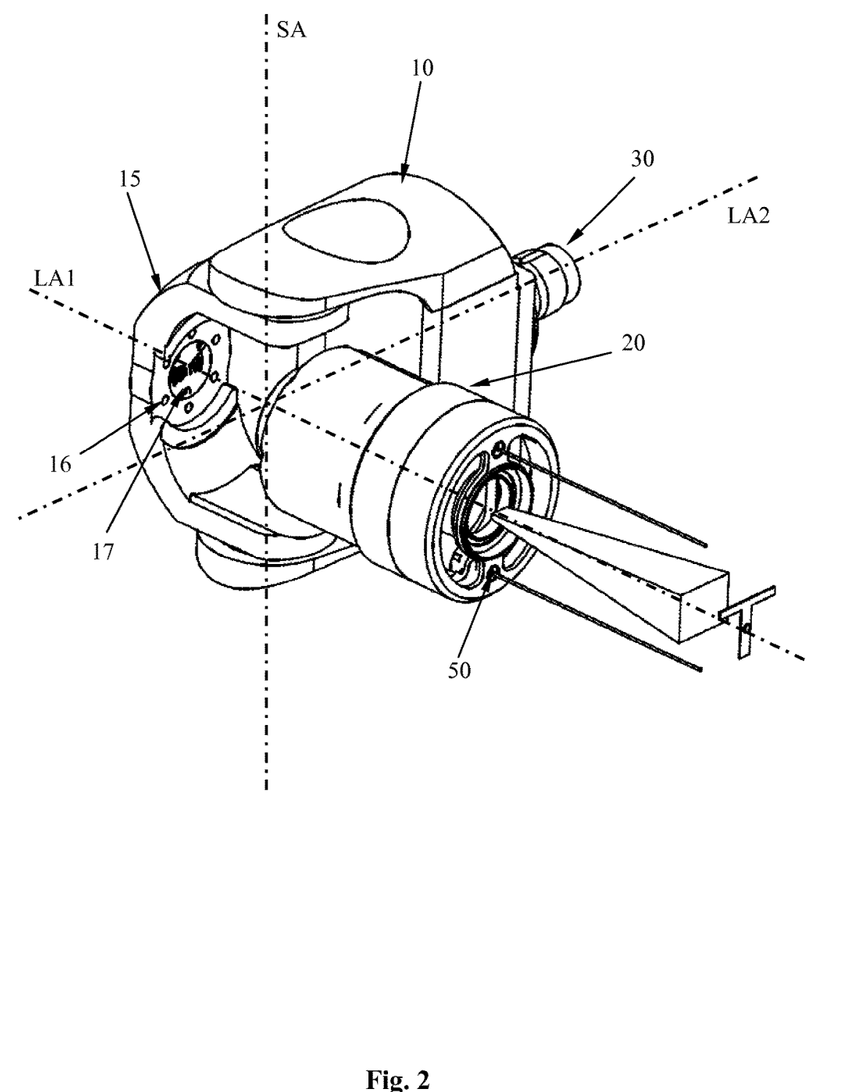
FIG. 2 shows a device according to the invention in perspective view according to which the rotation module is decoupled from the pivoting fork.

FIG. 2 shows a device according to the invention, according to which the pivoting housing 10 is rotated by an angle of 90° around the longitudinal axis LA2, the pivoting fork 15 is pivoted by an angle of 90° about the pivot axis SA, and the rotation module 20 is released from the pivoting fork 15.

In a particularly preferred embodiment of the invention, the rotation module 20 may be releasable from the pivoting fork 15, in order to, for example, enable a specifically simple replacement of the rotation module. Thereby, differently configured rotation modules may be connected to the pivoting fork 15 without the pivoting fork and the pivoting housing having to be replaced.

The pivoting fork 15, in the embodiment shown in FIG. 2, has a number of boring holes 16, which are arranged spaced apart from each other around the longitudinal axis LA1. The longitudinal axis LA1 of the rotation module 20 thereby corresponds to the longitudinal axis of the pivoting fork 15. At the rear side of the rotation module 20, corresponding screws and bolts, respectively, are provided which may be brought into engagement with the boring holes 16, in order to fixedly connect the rotation module 20 to the pivoting fork 15.

In an alternative embodiment not shown here, the pivoting fork 15 may have a number of bolts, which are arranged spaced apart with respect to each other around the longitudinal axis LA1, and which may be brought into engagement with the blind holes arranged at the rear side of the rotation module 20 and corresponding to the bolts.

According to a yet further embodiment, at the rear side of the rotation module 20 and at the pivoting fork 15, boring holes may be provided, which are arranged around the longitudinal axis LA1 respectively spaced apart with respect to each other, and which correspond to each other. Screws may then be passed through the boring holes of the pivoting fork, and may be fixed in the respective boring hole of the rotation module.

Within the boring holes 16, a contact board 17 is arranged, which corresponds to a contact board provided at the rear side of the rotation module 20 and which may be operatively coupled to the contact board, respectively, arranged at the rear side of the rotation module 20. This, for example, may be accomplished by means of a pin provided at either one of the two contact boards.

Thereby, the rotation module 20 may be simply introduced into the pivoting fork 15, and may be connected to the pivoting fork 15, as well as may be released from the pivoting fork 15 again very easily.

According to the embodiments of the device according to the invention shown here, a rotary sensor and a rotation angle sensor, respectively, may be respectively assigned to the longitudinal axes LA1, LA2, and the pivot axis SA, by means of which the rotation angle or pivot angle may be detected. Depending on a detected rotation angle or pivot angle, one of the two other rotation or pivot angles, or both rotation or pivot angles may be adjusted, which, for example, may be accomplished by means of an electromotor which is assigned to the respective rotation or pivot axis.

For example, an electromotor assigned to the rotation module 20 may rotate by an angle around the longitudinal axis LA1, which corresponds to the negative rotation angle of the pivot housing 10 about the longitudinal axis LA2. Thereby, it is guaranteed that the picture taken by the camera 40 always is in the correct position independently of the rotation angle of the pivoting housing 10 around the longitudinal axis LA2.

In an embodiment of the invention, the rotation module 20 may, however, also be rotated independently of the rotation angle of the pivoting housing 10 around the longitudinal axis LA2 by a certain angle around the longitudinal axis LA1, which is particularly preferable, if a tool, for example, a claw is provided at the rotation module and in the rotation module, respectively, as is shown with respect to FIG. 2.

Instead of the boring holes 16 in the pivoting fork 15 and the screws and bolts, respectively, corresponding to the boring holes 16, also a bayonet closure for fixation of the rotation module 20 on the pivoting fork 15 may be provided, wherein the connections between the two contact boards at the pivoting fork and at the rotation module need to be adapted correspondingly. Thereby, an even faster release of the rotation module 20 from the pivoting fork 50 and an even faster connection of a rotation module 20 to the pivoting fork 15, respectively, is enabled.

Figure 3:
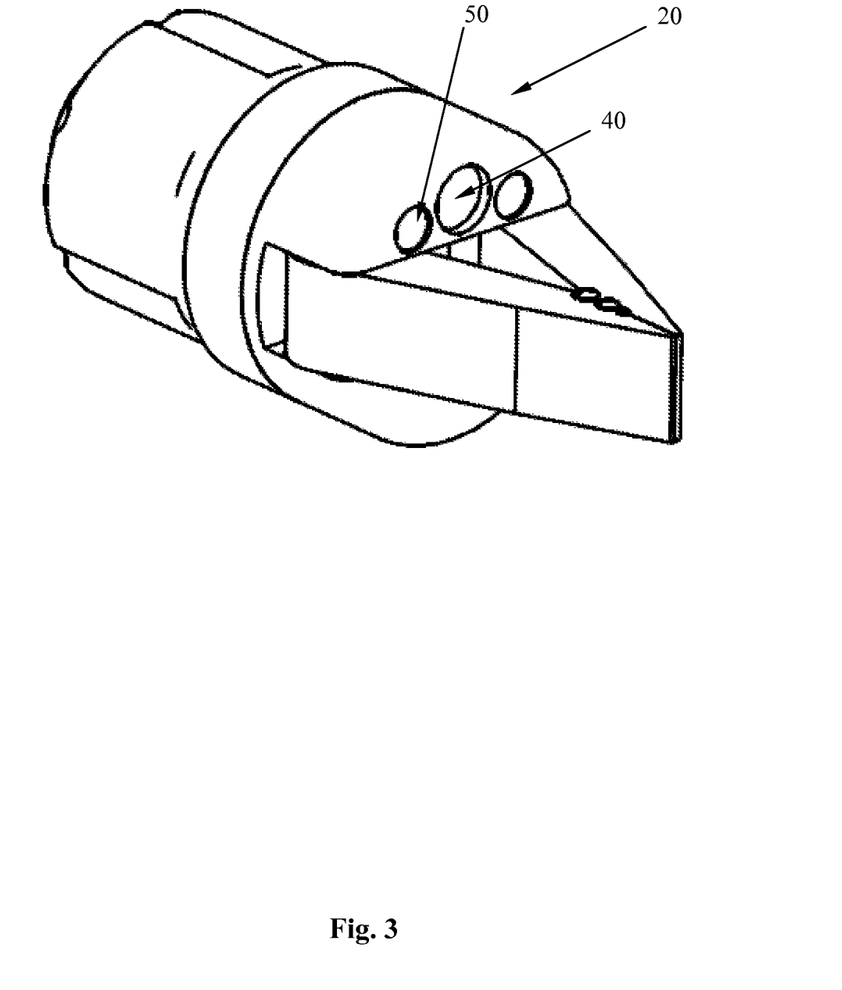
FIG. 3 shows a rotation module of a device according to the invention, wherein a tool is arranged at the rotation module.

FIG. 3 shows an alternative embodiment of a rotation module 20 of a device according to the invention.

The rotation module 20, here, comprises a claw or two jaws of pliers. Above the pliers, a camera 40 and two laser diodes 50 are provided, in order to illuminate and record, respectively, the object to be processed and to be grasped, respectively, by the pliers. In case a tool is arranged at the rotation module 20, it is preferable, if the rotation module 20 may be rotated independently of the rotation angle of the pivoting housing 10 around the longitudinal axis LA2, in order to, for example, assume an optimal grasping position with respect to the pliers.

Instead of pliers, for example, also milling means may be provided, in order to, for example, specifically mill away depositions or incrustations within the pipe. Because the rotation module and the device, respectively, can be rotated and pivoted, respectively, around all three axes, the pliers and the milling device, respectively, may be brought into any arbitrary and required, respectively, position or a predetermined or arbitrary milling curve may be followed.

Figure 4A:
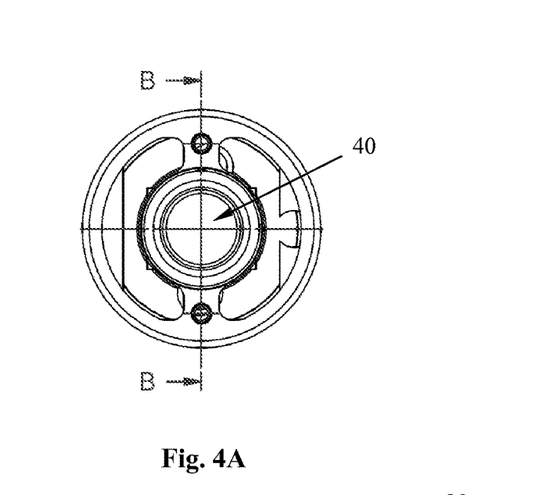
FIGS. 4A and 4B show a sectional view of a rotation module of a device according to the invention.
Figure 4B:
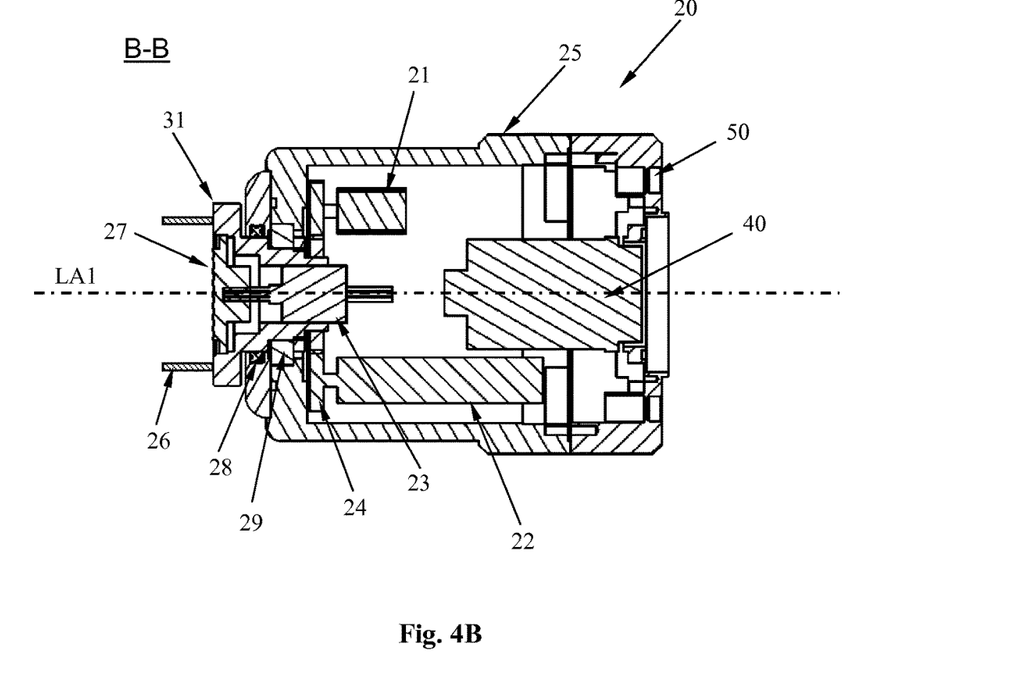

FIG. 4A shows a detailed view of a rotation module 20 in a sectional view along the section axis B-B (FIG. 4B).

The rotation module 20 comprises a housing 25, which is supported rotatably around its longitudinal axis LA1 on a rotation axis and shaft 31, respectively. The housing preferably is configured in an air-tight or water-tight manner. For this, in the rear area of the housing 25, where the housing 25 rests on the rotation axis and shaft, respectively, a sealing 28 is provided, which here is configured as a circumferential sealing, for example, as an O-ring. In the front region of the housing 25, the housing wall has light-transmissive regions, behind which a camera 40 or laser diodes 50 may be arranged. The light-transmissive regions may, for example, be realized by glass inserts, whereby preferably it is taken care for the glass inserts being inserted in an air-tight and water-tight manner, respectively. An air-tight and water-tight housing, respectively, in particular, has the advantage for use with the device according to the invention in an inspection system, in particular, in a sewer and pipe, respectively, inspection system, that the electrical and mechanical components arranged in the interior of the housing 25 are protected from water and dirt. A further advantage is that the rotation module 20 may be configured in an explosion-protected manner.

Further, the housing 25 is supported at the rear side and in the region of the rotation axis and the shaft 31, respectively, by means of a support 29 on the shaft and rotation axis 31, respectively, in order to guarantee an easy rotation of the housing 25 on the shaft 31 around the longitudinal axis LA1.

At the rear side of the rotation axis and shaft 31, respectively, pins, bolts or screws 26 are arranged, which substantially are aligned in parallel to the longitudinal axis LA1. The bolts and screws 26, respectively, correspond to the boring holes 16 of the pivoting fork 15 shown in FIG. 2. The rotation module 20 may be fixed to the pivoting fork 15 by inserting the bolts and screws 26, respectively, into the boring holes 16 of the pivoting fork 15, which are intended for this, and may, for example, be screwed at the rear side of the pivoting fork by means of a nut.

Thereby, a simple replacement of the rotation module 20 is enabled without the pivoting fork 15 and/or the pivoting housing 10 having to be replaced, too.

As an alternative to the screws 26 and the boring holes 16 of the pivoting fork 15 shown here, also a quick-release coupling, for example, in form of a bayonet connector, may be provided such that the rotation module only has to be fitted onto the pivoting fork, and may be blocked by means of rotation about a certain angle at the pivoting fork.

Within the shaft and rotation axis 31, respectively, in axial direction, i.e., along the longitudinal axis LA1, a slip ring 23 may be provided, which serves for signal and energy transmission between the rotation module and the pivoting fork 15. Thereby, the housing 25 may be rotated about an arbitrary rotation angle in both directions around the longitudinal axis LA1.

Further, in the rear area of the shaft and rotation axis 31, respectively, a contact board 27 is inserted, which is coupled operatively to the slip ring 23. The contact board 27 further may be operatively coupled to the contact board 17 of the pivoting fork 15 shown in FIG. 2. The coupling of the contact board of the rotation module 20 to the contact board 15, for example, may be effected by a pin provided at either one of the two contact boards.

In the interior of the housing 25, a rotary encoder 21 and a motor 22, for example, an electromotor, are arranged. Via the contact board 27 and the slip ring 23, all electronic components arranged within the housing 25, are supplied with energy. Further, the signal transmission between the electronic components arranged in the housing and the inspection system is carried out via the contact board 27 and the slip ring 23.

The rotary encoder 21 and the electromotor 22 are fixedly connected to the housing 25.

The electromotor 22 has, in the embodiment shown here, a gear wheel connection with a slip coupling, wherein the gear wheel connection 24 engages with the shaft and rotation axis 31, respectively, such that a rotation of the gear wheel connection effects a rotation of the housing 25 around the longitudinal axis LA1. As an alternative to the gear wheel connection 24, a coupling of the electromotor to the shaft and rotation axis 31, respectively, may be effected, for example, by means of a belt.

The rotary encoder 21 also engages with the shaft and rotation axis 31, respectively, such that during rotation of the housing about the shaft and rotation axis 31, respectively, the rotation angle of the housing with respect to the shaft 31 may be determined. Preferably, the gear transmission ratio between the shaft 31 and the rotary encoder 21 is selected to be 1:1 such that upon a complete rotation of the housing 25 around the shaft 31, the shaft of the rotary encoder 21 also exactly rotates one time. Of course, also other gear transmission ratios may be provided.

According to an embodiment of the invention, the rotation angle of the pivoting housing 10 detected by the rotation angle sensor is used, in order to control the electromotor 22 such that the latter effects a rotary movement of the housing 25 about a rotation angle, which corresponds to the negative rotation angle of the pivoting housing. This is specifically advantageous, if a camera 40 is provided within the housing 25, and if it is required that the image and video image, respectively, recorded by the camera 40 always is taken in the correct position. For this, the rotary encoder 21 is provided, in order to determine the rotation angle of the housing 25 about the longitudinal axis LA1. Thereby, the housing 25 may be rotated around the longitudinal axis LA1 as long as the rotation angle detected by the rotary encoder corresponds to the negative rotation angle of the pivoting housing.

According to an embodiment of the invention, the housing 25 may also be rotated around the longitudinal axis LA1 independently of the rotation angle of the pivoting housing 10, i.e., the rotation angle of the housing 25 may be different from the (negative) rotation angle of the pivoting housing. This is specifically advantageous, if a tool, as for example, shown with respect to FIG. 3, is provided on the rotation module 20. Thereby, the tool, for example, a claw, may be rotated in an optimal position with respect to the grasping of an object. For example, an operator of the inspection system may set a rotation of the housing 25 by a rotation angle of, e.g., 30°. The electromotor 22 then will rotate the housing 25 until the rotary encoder 21 also detects a rotation angle of 30°.

In the example shown in FIGS. 4A and 4B, also two laser diodes 50 are arranged in the housing, which may, for example, be used for the projection of reference points onto an object. These reference points may then be recorded by the camera 40, and appear in the recorded image in the correct position, because the camera 40 as well as also the laser diodes 50 are rotated together with the housing 25.

The provision of the electromotor 22 and the rotary encoder 21 within the interior of the housing and the configuration of the rotation module 20 such that the entire housing 25 is rotated around the longitudinal axis LA1 together with the electromotor provides the advantage that the housing with all components accommodated therein and attached thereto, respectively, is rotated. In order to, for example, obtain an image in the correct position, only the housing 25 has to be brought in a position, wherein at the same time also the reference points generated by the laser diodes 50 are displayed in the correct position on the recorded image. Thereby, it is avoided that neither the camera 40 nor the laser diodes 50 and other components, respectively, have to be rotated separately, in order to, for example, secure the recording of an image in the correct position.

The complexity of the rotation module, thereby, is substantially decreased, which at the same time results in lower production costs and a reduced susceptibility to errors.

Because all three axes, i.e., the longitudinal axis LA2 of the pivoting housing, the longitudinal axis LA1 of the rotation module, and the pivot axis SA of the pivoting fork are assigned to a rotary encoder and rotation angle sensor, respectively, and to a corresponding drive, the rotation module may be brought into any arbitrary position within the interior of a pipe and sewer, respectively. By providing the slip ring 23 in the rotation module 20, rotary movements of the rotation module may be performed in excess of 360°, increasing the flexibility, for example, during an inspection and reducing the duration of an inspection. The use of a plug mechanism, which is formed by bolts and screws 26, respectively, and the boring holes 16, secures an easy and fast replacement of a rotation module such that, for example, the rotation module shown in FIGS. 4A and 4B may be replaced in a particular easy and fast manner by the rotation module shown in FIG. 3 with a tool.

| | Reference numerals |
|---|---|
| 10 | pivoting housing |
| 15 | pivoting board fork |
| 16 | boring holes for connecting the rotation module to the pivoting fork |
| 17 | first contact board of the pivoting fork |
| 20 | rotation module (for camera or claws) |
| 21 | rotary encoder |
| 22 | motor |
| 23 | slip ring |
| 24 | gear wheel connection with slip coupling |
| 25 | housing of the rotation module |
| 26 | screws |
| 27 | second contact circuit board of the rotation module |
| 28 | sealing |
| 29 | support |
| 30 | rotation axis of the pivoting housing |
| 31 | rotation axis of the rotation module |
| 40 | camera |
| 50 | laser diodes |
| 51 | laser beams for measurement |
| B-B | section axis |
| LA1 | longitudinal axis of the rotation module |
| LA2 | longitudinal axis of the pivoting housing |
| SA | pivot axis of the pivoting fork |

What is claimed is:

1. A device for a sewer and pipe inspection system comprising a rotation module (20), which is coupled to a pivoting housing (10), wherein the rotation module comprises a slip ring (23) for signal and energy transmission, respectively, between the rotation module and the pivoting housing,
   the device further comprising a pivoting fork (15) to which the rotation module (20) is connected releasably, and by means of which the rotation module is coupled to the pivoting housing (10), wherein the pivoting fork is pivotable about a pivot axis relative to the pivoting housing,
   wherein the pivoting fork (15) is arranged between two side walls of the pivoting housing (10),
   wherein the pivoting fork (15) comprises two fork legs between which the rotation module (20) is arranged, wherein the rotation module is arranged at least partially within both the two fork legs and the two side walls, and
   wherein the rotation module is rotatable about the longitudinal axis of the pivoting fork relative to the pivoting fork (15).

2. The device of claim 1, wherein a first contact board (17) is arranged at the pivoting fork (15), and a second contact board (27) is arranged at the rotation module (20), wherein the first contact board is operatively couplable to the second contact board, and wherein the second contact board is operatively coupled to the slip ring (23).

3. The device of claim 1, wherein the pivoting housing (10) is rotatable around its longitudinal axis (LA2).

4. The device of claim 1, wherein the rotation module (20) comprises a housing (25) and a rotation axis (31), wherein the housing is supported rotatably about the rotation axis on the rotation axis, wherein in the housing, a rotary encoder (21) and a motor (22) are arranged, which respectively are fixedly connected to the housing, wherein the rotary encoder and the motor are coupled to the rotation axis, wherein the motor is provided for rotating the housing relative to the rotation axis, and wherein the rotary encoder is provided to detect the rotation angle of the housing relative to the rotation axis.

5. The device of claim 4, wherein the slip ring (23) is arranged in the rotation axis (31).

6. The device of claim 4, wherein the motor (22) is coupled to the rotation axis via a gear wheel connection (24), preferably, a gear wheel connection with slip coupling.

7. The device of claim 4, wherein an imaging means (40) is arranged within the housing (25).

8. The device of claim 4, wherein one, preferably two illuminating means (50), preferably laser diodes, are arranged within the housing (25).

9. The device of claim 4, wherein a tool, in particular, a claw or milling means, or sensors are arranged within the housing (25) or at the housing.

10. The device of claim 4, wherein the housing (25) is adapted to be pressure- or water-tight.

11. The device of claim 1, wherein a rotation sensor for detection of the respective rotation and a pivot angle, respectively, is respectively assigned the longitudinal axis (LA1) of the rotation module (20), a longitudinal axis (LA2) of the pivoting housing (10) or the pivot axis of the pivoting fork (15).

* * * * *